United States Patent
Ahn

(10) Patent No.: US 11,796,718 B2
(45) Date of Patent: Oct. 24, 2023

(54) OPTICAL LAMINATE AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventor: Jong Nam Ahn, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 159 days.

(21) Appl. No.: 17/233,644

(22) Filed: Apr. 19, 2021

(65) Prior Publication Data

US 2021/0325572 A1    Oct. 21, 2021

(30) Foreign Application Priority Data

Apr. 20, 2020    (KR) .................. 10-2020-0047453

(51) Int. Cl.
| | | |
|---|---|---|
| *G02B 1/14* | (2015.01) | |
| *C09J 133/06* | (2006.01) | |
| *C09J 175/14* | (2006.01) | |
| *C09J 133/26* | (2006.01) | |

(52) U.S. Cl.
CPC .............. *G02B 1/14* (2015.01); *C09J 133/06* (2013.01); *C09J 133/26* (2013.01); *C09J 175/14* (2013.01)

(58) Field of Classification Search
CPC .............................................. G02B 1/00–1/18
See application file for complete search history.

(56) References Cited

U.S. PATENT DOCUMENTS

| | | | |
|---|---|---|---|
| 9,706,649 B2 | 7/2017 | Jung et al. | |
| 10,815,378 B2 | 10/2020 | Kim et al. | |
| 2012/0314294 A1* | 12/2012 | Nakayama | B05D 5/063 |
| | | | 528/26 |
| 2015/0159044 A1* | 6/2015 | Bae | C08G 59/3281 |
| | | | 523/435 |
| 2016/0319076 A1* | 11/2016 | Ju | C08G 73/1003 |
| 2017/0101540 A1* | 4/2017 | Tiang | C09D 5/1687 |
| 2018/0101198 A1* | 4/2018 | Choi | G06F 3/041 |
| 2019/0023860 A1 | 1/2019 | Kim et al. | |
| 2019/0033494 A1 | 1/2019 | Kim et al. | |
| 2020/0024401 A1 | 1/2020 | Ryu et al. | |

FOREIGN PATENT DOCUMENTS

| | | | |
|---|---|---|---|
| CN | 103396754 A | * | 11/2013 |
| JP | 2018086802 A | | 6/2018 |
| JP | 2018144285 A | | 9/2018 |
| KR | 20120097769 A | | 9/2012 |
| KR | 20130074167 A | | 7/2013 |
| KR | 20140063304 A | | 5/2014 |
| KR | 101641207 A | | 7/2016 |
| KR | 20160089679 A | | 7/2016 |
| KR | 20160142535 A | | 12/2016 |
| KR | 20170088293 A | | 8/2017 |
| KR | 20170136269 A | | 12/2017 |
| KR | 20180018307 A | | 2/2018 |
| KR | 101839293 B1 | | 3/2018 |
| KR | 20180131378 A | | 12/2018 |
| KR | 20190012847 A | | 2/2019 |
| KR | 20190029110 A | | 3/2019 |
| KR | 20190080235 A | | 7/2019 |
| KR | 20190090300 A | | 8/2019 |

OTHER PUBLICATIONS

Machine translation of CN103396754. Retrieved Nov. 18, 2022.*
Yoo et al. "Hydroxyl-Terminated Polybutadiene Liquid Resins for Adhesives Applications". Adhesives & Sealants Industry, (2017); pp. 1-8.*

* cited by examiner

*Primary Examiner* — Prashant J Khatri

(74) *Attorney, Agent, or Firm* — THE WEBB LAW FIRM

(57) ABSTRACT

The present invention relates to an optical laminate and a flexible display panel including the same, and more particularly, to an optical laminate including a self-restoration barrier adhesive layer and a flexible display panel including the same.

20 Claims, No Drawings

OPTICAL LAMINATE AND FLEXIBLE DISPLAY PANEL INCLUDING THE SAME

CROSS-REFERENCE TO RELATED APPLICATION

This application claims priority to Korean Patent Application No. 10-2020-0047453 filed Apr. 20, 2020, the disclosure of which is hereby incorporated by reference in its entirety.

BACKGROUND OF THE INVENTION

Field of the Invention

The following disclosure relates to an optical laminate and a flexible display panel including the same, and more particularly, to an optical laminate including a self-restoration barrier adhesive layer and a flexible display panel including the same.

DESCRIPTION OF RELATED ART

A thin type display device such as a liquid crystal display device or an organic light emitting diode display device is implemented in a touch screen panel type, and has been widely used in various smart devices having portability such as a smart phone, a tablet PC, and various wearable devices.

Such a portable touch screen panel-based display device is provided with a display protective window cover on a display panel for protecting the display panel from a scratch or external impact. Recently, in accordance with development of a foldable display device having flexibility, as a material of the window cover, glass has been replaced with plastic.

In order for a film to be used as such a window cover film of the display panel, the film is required to be flexible so as to be repeatedly bendable, to prevent occurrence of a crack, whitening, or the like at the time of being bent, to have optical physical properties such as excellent transparency and a low yellow index, and to prevent damage to the display panel due to an external force.

In addition, it is required for the window cover film to prevent deformation under a high-temperature and high-humidity condition during a production process, to prevent damage to an OLED panel device applied to a flexible display panel, and to have excellent humidity-blocking or water-blocking properties.

RELATED ART DOCUMENT

[Patent Document]
(Patent Document 1) Korean Patent Laid-Open Publication No. 10-2013-0074167 (Jul. 4, 2013)

SUMMARY OF THE INVENTION

An embodiment of the present invention is directed to providing an optical laminate having excellent adhesion to a substrate by including an adhesive layer, and having excellent transparency and mechanical strength, and optical physical properties such as a low yellow index, and a window cover film including the same.

Another embodiment of the present invention is directed to providing an optical laminate capable of being applied to a window cover film, and specifically, to a foldable window cover film, because the optical laminate has excellent adhesion and optical properties, is flexible and bendable so as to be foldable, has excellent self-restoration properties after being bent, and prevents occurrence of a crack, whitening, or the like at the time of being bent, and a window cover film including the same.

Still another embodiment of the present invention is directed to providing an optical laminate having excellent properties capable of minimizing damage to a display panel due to an external force by including an adhesive layer having an elastic restoring force, and a window cover film including the same.

Further still another embodiment of the present invention is directed to providing an optical laminate having excellent humidity-blocking or water-blocking properties, and a window cover film including the same.

As a result of intensive studies to solve the above problems, the present inventors found that it is possible to provide a film exhibiting all the above physical properties in a specific laminate structure, thereby completing the present invention.

In one general aspect, an optical laminate includes a polyimide-based film; a self-restoration barrier adhesive layer formed on one surface of the polyimide-based film; and a silicon oxide deposition layer formed on the other surface of the polyimide-based film.

The optical laminate may further include a hard coating layer formed on the silicon oxide deposition layer.

The optical laminate may further include one or more functional coating layers selected from an antistatic layer, an anti-fingerprint layer, an anti-fouling layer, an anti-scratch layer, a low-refractive layer, an anti-reflective layer, and an impact absorption layer, the functional coating layer being formed on the hard coating layer.

A water vapor transmission rate of the optical laminate may be $1\times10^{-3}$ g/m²·day or less.

The optical laminate may have a total light transmittance of 90% or more, a haze of 1% or less, and a yellow index of 3 or less.

The optical laminate may have a pencil hardness of 3 B or higher and a Vickers hardness of 30 HV or higher.

The silicon oxide deposition layer may be formed by a method selected from a chemical vapor deposition (CVD) method, an atomic layer deposition (ALD) method, a pulse laser deposition (PLD) method, an E-beam evaporation method, a thermal evaporation method, and a laser molecular beam epitaxy (L-MBE) method.

The silicon oxide deposition layer may be formed of $SiO_2$.

The self-restoration barrier adhesive layer may have an adhesive force to glass of 0.5 kgf/inch or more.

The self-restoration barrier adhesive layer may be formed of a curable resin having a polybutadiene structure.

The polybutadiene structure may be a structure derived from polybutadiene-modified urethane-based (meth) acrylate.

The self-restoration barrier adhesive layer may further have a structure derived from acrylate having an aliphatic ring.

The polyimide-based film may have an elongation at break measured according to ASTM D882 of 8% or more and a modulus measured according to ASTM D882 of 6 GPa or more.

The polyimide-based film may have a light transmittance measured at 388 nm according to ASTM D1746 of 5% or more, a total light transmittance measured at 400 to 700 nm according to ASTM D1746 of 87% or more, a haze of 2.0% or less, a yellow index of 5.0 or less, and a b* value of 2.0 or less.

The polyimide-based film may have a polyamide-imide structure.

The polyimide-based film may include a unit derived from a fluorine-based aromatic diamine, a unit derived from an aromatic dianhydride, and a unit derived from an aromatic diacid dichloride.

The polyimide-based film may further include a unit derived from an alicyclic dianhydride.

A thickness of the polyimide-based film may be 10 to 500 μm, a thickness of the self-restoration barrier adhesive layer may be 10 to 100 μm, and a thickness of the silicon oxide deposition layer may be 2 to 500 nm.

A thickness of the hard coating layer may be 1 to 50 μm.

A pencil hardness of the hard coating layer may be 3 H or higher.

A thickness of the functional coating layer may be 0.01 to 50 μm.

A water contact angle of the functional coating layer may be 105° or more.

In another general aspect, a window cover film includes the optical laminate.

In still another general aspect, a flexible display panel includes the optical laminate.

Other features and aspects will be apparent from the following detailed description, the drawings, and the claims.

DESCRIPTION OF THE INVENTION

Hereinafter, the present invention will be described in more detail through specific examples or exemplary embodiments. However, each of the following specific examples or exemplary embodiments is merely one reference example for describing the present invention, and the present invention is not limited thereto and may be implemented in various forms.

In addition, unless otherwise defined, all the technical and scientific terms used herein have the same meanings as those commonly understood by those skilled in the art to which the present invention pertains. The terms used in the present invention are merely used to effectively describe a specific exemplary embodiment, but are not intended to limit the present invention.

In addition, unless the context clearly indicates otherwise, the singular forms used in the specification and appended claims are intended to include the plural forms.

In addition, unless explicitly described to the contrary, "comprising" any components will be understood to imply further inclusion of other components rather than the exclusion of any other components.

As a result of intensive studies to solve the above problems, the present inventors found that in a case of a specific laminate structure, it is possible to provide an optical laminate which has excellent transparency, excellent mechanical strength, and a low yellow index, is flexible, has excellent bending properties, and prevents occurrence of a fine crack even after being repeatedly bent, thereby completing the present invention.

In addition, the present inventors found that when an optical laminate has a specific structure and a self-restoration barrier adhesive layer having self-restoration properties is applied, a press-fitting strength of the optical laminate may be improved to minimize damage to an inner panel due to an external force, a mark or a crack does not occur even when the optical laminate is repeatedly bent, a delamination phenomenon of the adhesive layer does not occur even when the optical laminate is repeatedly deformed due to excellent adhesion, and a gas transmission rate, and more specifically, a water vapor transmission rate may be significantly reduced, thereby completing the present invention.

As an example, an optical laminate according to a first exemplary embodiment of the present invention may be obtained by sequentially laminating a silicon oxide deposition layer, a polyimide-based film, and a self-restoration barrier adhesive layer in a gas transmission direction. By laminating the layers in the above order, it is possible to achieve excellent optical physical properties, water-blocking properties, adhesion, bendability, and an increase in mechanical strength at the same time.

As an example of the first exemplary embodiment, in the optical laminate, a thickness of the polyimide-based film may be to 500 μm, a thickness of the self-restoration barrier adhesive layer may be 10 to 100 μm, and a thickness of the silicon oxide deposition layer may be 1 to 500 nm, but the present invention is not limited thereto. When the optical laminate has the laminate structure described above, it is possible to provide an optical laminate having a small thickness, a significantly low water vapor transmission rate, and more excellent optical properties, but the present invention is not limited thereto.

An optical laminate according to a second exemplary embodiment of the present invention may be obtained by sequentially laminating a hard coating layer, a silicon oxide deposition layer, a polyimide-based film, and a self-restoration barrier adhesive layer in a gas transmission direction. The optical laminate further includes the hard coating layer as described above, such that a light transmittance of the entire film may be further improved, a water vapor transmission rate may be further reduced, mechanical strength may be further increased, and occurrence of a scratch or the like on a surface of the film may be prevented. A thickness of the hard coating layer may be 1 to 50 μm. Within the above range, the hard coating layer may not only serve to prevent occurrence of a scratch on the surface but may further reduce the water vapor transmission rate and further increase the mechanical strength, which is preferable.

An optical laminate according to a third exemplary embodiment of the present invention may be obtained by sequentially laminating a functional coating layer, a hard coating layer, a silicon oxide deposition layer, a polyimide-based film, and a self-restoration barrier adhesive layer in a gas transmission direction. The functional coating layer may be one or more selected from an antistatic layer, an anti-fingerprint layer, an anti-fouling layer, an anti-scratch layer, a low-refractive layer, an anti-reflective layer, and an impact absorption layer. The optical laminate further includes the functional coating layer as described above, such that functionability may be further imparted to the entire film. A thickness of the functional coating layer may be 0.01 to 50 μm. Within the above range, it is possible to obtain an optical laminate having a small thickness and sufficient desirable physical properties. More preferably, the functional coating layer may be an anti-fingerprint layer. The anti-fingerprint layer is formed, such that it is possible to impart a touch feeling suitable for use in a window cover film of a flexible display panel. More preferably, the functional coating layer may be an anti-fingerprint layer having a water contact angle of 105° or more.

The first to third exemplary embodiments are merely illustrative of the present invention in more detail, but the present invention is not limited thereto.

In the present invention, it is confirmed that by laminating the self-restoration barrier adhesive layer, the water vapor transmission rate may be further significantly reduced and bending properties may be further improved as compared to a film in which the self-restoration barrier adhesive layer is not formed, and elasticity and flexibility may be further improved by self-restoration properties of the self-restoration barrier adhesive layer.

The self-restoration barrier adhesive layer is a term expressing that it has self-restoration properties. As a non-limiting example of physical properties thereof, an adhesive force to glass may be 0.5 kgf/inch or more, and a storage modulus after curing may be $1 \times 10^4$ Pa or more. In addition, when the self-restoration barrier adhesive layer is laminated in the optical laminate of the present invention, the water vapor transmission rate of the optical laminate may be $1 \times 10^{-3}$ $g/m^2 \cdot day$ or less, but the present invention is not limited thereto.

According to an exemplary embodiment of the present invention, the water vapor transmission rate of the optical laminate may be $1 \times 10^{-3}$ $g/m^2 \cdot day$ or less. In particular, the optical laminate includes the self-restoration barrier adhesive layer, such that the water vapor transmission rate may be increased by 3 orders or higher, as compared to a film in which the self-restoration barrier adhesive layer is not formed.

According to an exemplary embodiment of the present invention, the optical laminate may have a light transmittance in a wavelength range of 350 to 800 nm of 85% or more, more specifically, 87% or more, more preferably 90% or more, and still more specifically, 90% to 92%. In addition, a total light transmittance of the optical laminate may be 88% or more, more preferably 90% or more, and specifically, 90% to 92%. Within the above range, it is possible to provide an optical laminate having optical physical properties suitable to be applied to a window cover film.

In addition, a yellow index of the entire optical laminate may be 3.0 or less, and more specifically, 2.0 or less. Within the above range, a change in yellow index due to long-term storage may be small.

In addition, a pencil hardness of the entire optical laminate may be 4 B or higher, preferably 3 B or higher, and more preferably 2 B or higher.

In addition, a Vickers hardness of the entire optical laminate may be 30 HV or higher, preferably 50 HV or higher, and more preferably 60 HV or higher.

In addition, dynamic bending properties of the entire optical laminate may mean that after each of in-folding and out-folding against a cylinder having a radius of 3 mm is continuously repeatedly performed 200,000 times, a crack or folded mark does not occur.

Hereinafter, respective components of the present invention will be described in detail.

<Self-Restoration Barrier Adhesive Layer>

In an exemplary embodiment of the present invention, the self-restoration barrier adhesive layer has excellent adhesion to glass, excellent elasticity, and self-restoration properties. Therefore, the self-restoration barrier adhesive layer is not delaminated or peeled off even when a bending operation is repeatedly performed. In addition, the water vapor transmission rate of the entire optical laminate may be further reduced.

Specifically, the self-restoration barrier adhesive layer may have an adhesive force to glass of 0.5 kgf/inch or more and a storage modulus after curing of $1 \times 10^4$ Pa or more. More specifically, the self-restoration barrier adhesive layer may have an adhesive force to glass of 0.8 kgf/inch or more and a storage modulus after curing of $1 \times 10^5$ Pa or more, and more preferably in a range of $1 \times 10^5$ Pa to $5 \times 10^5$ Pa.

The optical laminate includes the self-restoration barrier adhesive layer having the above physical properties, such that damage due to an external force may be minimized, and a crack due to repeated bending may not occur, resulting in an improvement of the dynamic bending properties. In addition, the water vapor transmission rate may be increased by 3 orders or higher, as compared to an optical laminate in which the self-restoration barrier adhesive layer is not included. The water vapor transmission rate of the entire optical laminate may be adjusted to $1 \times 10^{-3}$ $g/m^2 \cdot day$ or less.

The self-restoration barrier adhesive layer provided to achieve the above physical properties may basically have a butadiene structure. More preferably, the self-restoration barrier adhesive layer has a structure derived from acrylate having a polybutadiene structure and an aliphatic ring, such that the self-restoration barrier adhesive layer may exhibit not only an excellent adhesive force to glass but also an excellent modulus and self-restoration properties. In addition, the water vapor transmission rate of the entire optical laminate may be further reduced.

Still more preferably, when the amount of polybutadiene structure in the self-restoration barrier adhesive layer is 20% or more in the total acrylate molecules, more excellent physical properties may be exhibited.

More specifically, the self-restoration barrier adhesive layer has a structure derived from a polybutadiene-modified urethane-based (meth)acrylate oligomer, a (meth)acrylate monomer having an aliphatic ring, a C8-C18 (meth)acrylate monomer, and a (meth)acrylamide-based monomer, such that it is possible to improve self-restoration properties and further reduce a water vapor transmission rate. The (meth)acrylate may be acrylate and methacrylate.

More specifically, the self-restoration barrier adhesive layer may include 20 to 80 wt % of the polybutadiene-modified urethane-based (meth)acrylate oligomer, 5 to 40 wt % of the (meth)acrylate monomer having an aliphatic ring, 5 to 40 wt % of the C8-C18 (meth)acrylate monomer, and 1 to 20 wt % of the (meth)acrylamide-based monomer. The present invention is not limited thereto, but within the above range, it is possible to exhibit an excellent adhesive force and to minimize a volume shrinkage rate after curing.

Hereinafter, a method of forming the self-restoration barrier adhesive layer will be described in detail.

The self-restoration barrier adhesive layer may be formed by applying a composition for a self-restoration barrier adhesive layer onto one surface of the polyimide-based film and curing the composition.

More specifically, the self-restoration barrier adhesive layer may be formed by applying a composition for a self-restoration barrier adhesive layer and then thermal curing the composition or curing the composition with ultraviolet rays. More specifically, the method of forming the self-restoration barrier adhesive layer may include an adhesive composition application step, a pre-curing step, a release film attaching step, an adhesion step performed after removing the release film, and a main curing step. The optical laminate of the present invention may be provided through from the pre-curing step to the release film attaching step.

The application step may be performed by coating the composition for a self-restoration barrier adhesive layer through bar-coating, slot-die coating, or the like. Next, the composition for a self-restoration barrier adhesive layer may be pre-cured by applying ultraviolet rays. Here, in the pre-curing step, the composition for a self-restoration barrier adhesive layer may be pre-cured by irradiating a layer onto which the composition for a self-restoration barrier adhesive layer is applied with ultraviolet rays in a light intensity of 600 to 1,200 $mJ/cm^2$. After the pre-curing is completed, a UV-blocking release film subjected to a release treatment with silicone is laminated to protect the self-restoration barrier adhesive layer.

Thereafter, the main curing may be performed by performing irradiation with ultraviolet rays in a light intensity of 600 to 1,200 mJ/cm² in a state where the self-restoration barrier adhesive layer is adhered to a target surface to be laminated in a state where the release film is removed.

The adhesive force to glass of the self-restoration barrier adhesive layer may be 0.5 Kgf/inch or more after the composition is subjected to the pre-curing, and 0.8 Kgf/inch or more after the composition is subjected to the main curing.

A thickness of the self-restoration barrier adhesive layer may be 5 to 100 μm, and more preferably 20 to 70 μm. Within the above range of the thickness, the adhesive force may be excellent, the water-blocking properties may be sufficiently exhibited, and hardness such as a pencil hardness may be sufficiently maintained, which is more preferable, but the present invention is not limited thereto.

In this case, in order to appropriately perform the main curing, the light transmittance of the optical laminate of the present invention is preferably 85% or more, and more preferably 90% or more.

As an example, the composition for a self-restoration barrier adhesive layer may include a polybutadiene-modified urethane-based (meth)acrylate oligomer, a (meth)acrylate monomer having an aliphatic ring, a C8-C18 (meth)acrylate monomer, a (meth)acrylamide-based monomer, and a photoinitiator.

By using the polybutadiene-modified urethane-based (meth)acrylate oligomer, bubbles generated in the polyimide-based film may be suppressed to form a uniform coating layer. Therefore, it is possible to provide an optical laminate which prevents delamination or deformation of the adhesive layer even when repeated deformation, such as bending of the adhesive layer, is performed and prevents occurrence of a crack due to bending because the optical laminate has elasticity and self-restoration properties, and has a lower water vapor transmission rate. A weight average molecular weight of the polybutadiene-modified urethane-based (meth)acrylate oligomer may be 500 to 50,000 g/mol. This is a value in terms of standard polystyrene measured by gel permeation chromatography.

The polybutadiene-modified urethane-based (meth)acrylate oligomer is obtained by modifying polybutadiene with (meth)acrylate, and also includes hydrogenated polybutadiene-modified urethane-based (meth)acrylate obtained by modifying hydrogenated polybutadiene with (meth)acryl.

The self-restoration barrier adhesive layer includes the (meth)acrylate monomer having an aliphatic ring, such that the water vapor transmission rate may be further reduced. As a specific example, one or a mixture of two or more selected from isobornyl (meth)acrylate, cyclohexyl (meth)acrylate, dicyclopentanyl (meth) acrylate, and tetrahydrofurfuryl (meth)acrylate may be used as the (meth)acrylate monomer having an aliphatic ring.

The self-restoration barrier adhesive layer includes the C8-C18 (meth)acrylate monomer, such that elasticity, self-restoration properties, and adhesion of the self-restoration barrier adhesive layer may be further improved. As a specific example, one or a mixture of two or more selected from n-octyl (meth)acrylate, isooctyl (meth)acrylate, n-nonyl (meth)acrylate, isodecyl (meth)acrylate, octadecyl (meth) acrylate, dodecyl (meth) acrylate, lauryl (meth)acrylate, and stearyl (meth)acrylate may be used as the C8-C18 (meth) acrylate monomer.

As a specific example, one or a mixture of two or more selected from N,N-dimethylacrylamide, N,N-diethylacrylamide, and monomethylacrylamide may be used as the (meth)acrylamide-based monomer, but the present invention is not limited thereto.

As the photoinitiator, one or a mixture of two or more selected from the group consisting of an azo-based compound, a peroxide-based compound, a hydroperoxide-based compound, and a perester-based compound may be used.

As a more specific example, the photoinitiator may include one or more selected from the group consisting of 2,4,6-trimethylbenzoyldiphenylphosphine oxide, bis(2,4,6-trimethylbenzoyl)phenylphosphine oxide, α,α-methoxy-α-hydroxyacetophenone, 2-benzoyl-2(dimethylamino)-1-[4-(4-morphonyl)phenyl]-1-butanone, 2,2-dimethoxy 2-phenyl acetophenone, 2,2-dimethoxy-2-phenyl-acetophenone, xanthone, 1-hydroxycyclohexylphenylketone, benzaldehyde, anthraquinone, 3-methylacetophenone, 1-(4-isopropyl-phenol)-2-hydroxy-2-methylpropan-1-one, thioxanthone, 4-chlorobenzophenone, 4,4'-dimethoxybenzophenone, 4,4'-diaminobenzophenone, benzoin propyl ether, and benzoin ethyl ether.

In order to improve the adhesive force, the composition may further include a tackifier, and may further include a UV absorber, a UV stabilizer, and an antioxidant, as additives.

<Polyimide-Based Film>

In an exemplary embodiment of the present invention, the polyimide-based film has excellent optical physical properties and mechanical physical properties, and may be formed of a material having an elastic force and a restoring force.

In an exemplary embodiment of the present invention, a thickness of the polyimide-based film may be 10 to 500 μm, 20 to 250 μm, or 30 to 110 μm.

In an exemplary embodiment of the present invention, the polyimide-based film may have a light transmittance measured at 388 nm according to ASTM D1746 of 5% or more or 5 to 80%, a total light transmittance measured at 400 to 700 nm according to ASTM D1746 of 87% or more, 88% or more, or 89% or more, a haze measured according to ASTM D1003 of 2.0% or less, 1.5% or less, or 1.0% or less, a yellow index measured according to ASTM E313 of 5.0 or less, 3.0 or less, or 0.4 to 3.0, and a b* value measured according to ASTM E313 of 2.0 or less, 1.3 or less, or 0.4 to 1.3. Within the above ranges, it is possible to provide a polyimide-based film having optical physical properties suitable to be applied to a window cover film.

In an exemplary embodiment of the present invention, the polyimide-based film may have a modulus measured according to ASTM D882 of 3 GPa or more, 4 GPa or more, 5 GPa or more, or 6 GPa or more, and an elongation at break measured according to ASTM D882 of 8% or more, 12% or more, or 15% or more. Within the above ranges, it is possible to provide a polyimide-based film having mechanical physical properties suitable to be applied to a window cover film.

In an exemplary embodiment of the present invention, the polyimide-based film is formed of a polyimide-based resin, and in particular, is formed of a polyimide-based resin having a polyamide-imide structure.

In addition, the polyimide-based film may be more preferably formed of a polyamide-imide-based resin having a fluorine atom and an aliphatic cyclic structure, and thus, the polyimide-based film may have excellent transparency, appearance quality, mechanical physical properties, and dynamic bending properties.

In an exemplary embodiment of the present invention, as an example of the polyamide-imide-based resin having the fluorine atom and the aliphatic cyclic structure, in a case where an amine-terminated polyamide oligomer derived from a first fluorine-based aromatic diamine and an aromatic diacid dichloride is produced, and a polyamide-imide polymer is produced by polymerizing the amine-terminated polyamide oligomer and monomers derived from a second fluorine-based aromatic diamine, an aromatic dianhydride, and an alicyclic dianhydride, the object of the present invention is better achieved, which is preferable. The types of the first fluorine-based aromatic diamine and the second fluorine-based aromatic diamine may be the same as or different from each other.

In an exemplary embodiment of the present invention, in a case where an amine-terminated oligomer in which an amide structure in a polymer chain is formed by the aromatic diacid dichloride is included as a diamine monomer, the optical physical properties may be improved, and in particular, the mechanical strength such as a fine flexural modulus may also be improved. Also, dynamic bending properties may be further improved. Therefore, the polyimide-based film may be suitably used in a window cover film of a flexible display that is repeatedly folded and unfolded.

In an exemplary embodiment of the present invention, when the resin has a polyamide oligomer block as described above, a molar ratio of the diamine monomer including the amine-terminated polyamide oligomer and the second fluorine-based aromatic diamine to the dianhydride monomer including the aromatic dianhydride and the alicyclic dianhydride according to the present invention may be 1:0.9 to 1.1, and more preferably 1:1. In addition, a content of the amine-terminated polyamide oligomer with respect to the entire diamine monomer is not particularly limited, but may be preferably 30 mol % or more, 50 mol % or more, and more preferably 70 mol % or more, in terms of satisfying the mechanical physical properties, the yellow index, and the optical properties of the present invention. In addition, a composition ratio of the aromatic dianhydride to the alicyclic dianhydride is not particularly limited, but is preferably 30 to mol %:70 to 20 mol %, in consideration of achieving the transparency, the yellow index, and the mechanical physical properties of the present invention, but the present invention is not limited thereto.

In an exemplary embodiment of the present invention, the polyamide-imide-based resin may have a unit derived from a fluorine-based aromatic diamine, such that physical properties such as mechanical physical properties and optical physical properties may be excellent.

In an exemplary embodiment of the present invention, the polyamide-imide-based resin may have a unit derived from an alicyclic dianhydride, such that optical physical properties may be excellent.

In an exemplary embodiment of the present invention, the polyamide-imide-based resin may have a unit derived from a fluorine-based aromatic diamine, a unit derived from an aromatic dianhydride, and a unit derived from an aromatic diacid dichloride, such that mechanical physical properties may be excellent.

In an exemplary embodiment of the present invention, the polyamide-imide-based resin is obtained by using a tetrapolymer having all of a unit derived from fluorine-based aromatic diamine, a unit derived from an aromatic dianhydride, a unit derived from an alicyclic dianhydride, and a unit derived from an aromatic diacid dichloride, such that it is possible to provide a polyimide-based film which has excellent optical properties such as transparency and excellent mechanical physical properties, prevents generation of warpage under a high-temperature and high-humidity environment, and has a small haze change and small heat shrinkage.

In addition, as another example, the polyamide-imide-based resin having the fluorine atom and the aliphatic cyclic structure may be a polyamide-imide-based resin obtained by mixing, polymerizing, and imidizing a fluorine-based aromatic diamine, an aromatic dianhydride, an alicyclic dianhydride, and an aromatic diacid dichloride. Such a resin has a random copolymer structure. A content of the aromatic diacid dichloride may be 40 moles or more, and preferably 50 to 80 moles, with respect to 100 moles of diamine. A content of the aromatic dianhydride may be 10 to 50 moles with respect to 100 moles of the diamine. A content of the alicyclic dianhydride may be 10 to moles with respect to 100 moles of the diamine. The polyamide-imide-based resin may be produced by polymerizing a diacid dichloride and a dianhydride with respect to the diamine monomer in a molar ratio of 1:0.8 to 1.1, and more preferably 1:1. The random polyamide-imide of the present invention is slightly different in the optical properties such as transparency, the mechanical physical properties, and the like from the block polyamide-imide resin, but may also fall within the scope of the present invention.

In an exemplary embodiment of the present invention, as the fluorine-based aromatic diamine, a mixture of 2,2'-bis(trifluoromethyl)-benzidine and another known aromatic diamine may be used, and 2,2'-bis(trifluoromethyl)-benzidine may be used alone. By using such a fluorine-based aromatic diamine, the optical properties and the yellow index of the polyamide-imide-based film may be improved based on the mechanical physical properties required in the present invention. In addition, a fine flexural modulus of the polyamide-imide-based film may be improved, and thus mechanical strength of the hard coated film may be improved and dynamic bending properties may be further improved.

The aromatic dianhydride may be one or a mixture of two or more of 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylidenediphenoxy) bis (phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(3,4-dicarboxyphenyl) dimethyl silane dianhydride (SiDA), and bis(dicarboxyphenoxy) diphenyl sulfide dianhydride (BDSDA), but the present invention is not limited thereto.

As an example, the alicyclic dianhydride may be one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof.

In an exemplary embodiment of the present invention, in the case where the amide structure is formed in the polymer chain by the aromatic diacid dichloride, the optical physical properties and the mechanical strength may be greatly improved, and the dynamic bending properties may be further improved.

The aromatic diacid dichloride may be a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof, but the present invention is not limited thereto.

Hereinafter, a method of producing the polyimide-based film will be described.

In an exemplary embodiment of the present invention, the polyimide-based film may be produced by applying a "polyimide-based resin solution" including a polyimide-based resin and a solvent onto a substrate, and performing drying or drying and stretching. That is, the polyimide-based film may be produced by a solution casting method.

As an example, the polyimide-based film may be formed by a step of producing an oligomer by reacting a fluorine-based aromatic diamine with an aromatic diacid dichloride, a step of preparing a polyamic acid solution by reacting the produced oligomer with a fluorine-based aromatic diamine, an aromatic dianhydride, and an alicyclic dianhydride, a step of producing a polyamide-imide resin by imidizing the polyamic acid solution, and a step of applying a polyamide-imide solution obtained by dissolving the polyamide-imide resin in an organic solvent.

Hereinafter, the respective steps will be described in more detail by using a case in which a block polyamide-imide film is produced, as an example.

The step of producing the oligomer may include a step of reacting the fluorine-based aromatic diamine with the aromatic diacid dichloride in a reactor, and a step of purifying and drying the obtained oligomer. In this case, a molar ratio of the fluorine-based aromatic diamine to the aromatic diacid dichloride may be 1.01 to 2 in order to produce an amine-terminated polyamide oligomer monomer. A molecular weight of the oligomer monomer is not particularly limited, but, for example, when a weight average molecular weight thereof is within a range of 1,000 to 3,000 g/mol, the polyimide-based film may have more excellent physical properties.

In addition, an aromatic carbonyl halide monomer such as terephthaloyl chloride or isophthaloyl chloride rather than terephthalic acid ester or terephthalic acid itself is preferably used to introduce an amide structure, which seems to affect the physical properties of the film by a chloride element, although the reason is not clear.

Next, the step of preparing the polyamic acid solution may be performed by a solution polymerization reaction in which the produced oligomer is reacted with the fluorine-based aromatic diamine, the aromatic dianhydride, and the alicyclic dianhydride in an organic solvent. As an example, the organic solvent used for the polymerization reaction in this case may be one or two or more polar solvents selected from dimethylacetamide (DMAc), N-methyl-2-pyrrolidone (NMP), dimethylformamide (DMF), dimethyl sulfoxide (DMSO), ethyl cellosolve, methyl cellosolve, acetone, ethyl acetate, and m-cresol.

More specifically, the polyamide-imide-based film in which an amide intermediate is uniformly distributed may be produced by producing an intermediate in a form of an oligomer having an amide unit by reacting a fluorine-based aromatic diamine with an aromatic diacid dichloride and then preparing a polyamic acid solution by reacting the oligomer with a fluorine-based aromatic diamine, an aromatic dianhydride, and an alicyclic dianhydride. As such, the amide intermediate is uniformly distributed in the entire film, such that the mechanical physical properties and the optical properties are excellent on the entire area of the film, coatability and coating uniformity of a coating composition used in a subsequent coating step for the self-restoration barrier adhesive layer and the like may be further improved. Therefore, optical physical properties of a final window cover film may be further improved. As a result, it is possible to provide a film which prevents occurrence of optical stains such as rainbow and mura phenomena and has excellent optical properties. In addition, it is possible to form a thin and uniform silicon oxide deposition layer.

Next, the step of producing the polyamide-imide resin by imidizing the polyamic acid solution may be performed through chemical imidization. More preferably, the polyamic acid solution is chemically imidized using pyridine and acetic anhydride. Subsequently, the polyamic acid solution may be imidized using an imidization catalyst and a dehydrating agent at a low temperature of 150° C. or lower, preferably 100° C. or lower, and more preferably, 50 to 150° C.

In the case where the polyamic acid solution is imidized by such a method, mechanical physical properties may be uniformly imparted to the entire film as compared to a case where the polyamic acid solution is imidized by heat at a high temperature.

One or two or more selected from pyridine, isoquinoline, and β-quinoline may be used as the imidization catalyst. In addition, one or two or more selected from acetic anhydride, phthalic anhydride, and maleic anhydride may be used as the dehydrating agent, but the present invention is not limited thereto.

In addition, the polyamide-imide resin may be produced by mixing the polyamic acid solution with an additive such as a retardant, a tackifier, an inorganic particle, an antioxidant, an ultraviolet stabilizer, or a plasticizer.

In addition, after the imidization is performed, the resin may be purified using the solvent to obtain a solid content, and the solid content may be dissolved in a solvent, thereby obtaining a polyamide-imide solution. The solvent may include, for example, N,N-dimethylacetamide (DMAc) and the like, but the present invention is not limited thereto.

The step of forming the polyamide-imide film is performed by applying the polyamide-imide solution onto a substrate and drying the polyamide-imide solution in a drying step divided into a drying region. In addition, a stretching step may be performed before or after the drying step, or a heat treatment step may be further performed after the drying step or the stretching step, if necessary. For example, glass, stainless steel, or a film may be used as the substrate, but the present invention is not limited thereto. The application may be performed by die coating, air knife coating, reverse roll coating, spray coating, blade coating, casting coating, gravure coating, spin coating, or the like.

<Silicon Oxide Deposition Layer>

In an exemplary embodiment of the present invention, the silicon oxide deposition layer is configured so as not to impair transparency while further reducing a gas transmission rate, and more specifically, a water vapor transmission rate. More preferably, the silicon oxide deposition layer may be formed of $SiO_2$, which may implement a more excellent light transmittance and a lower yellow index as compared to a case where the silicon oxide deposition layer is formed of $SiO_x$ (X=1 to 1.5).

By forming the silicon oxide deposition layer as described above, it is possible to provide an optical laminate having more excellent transparency and a significantly low water vapor transmission rate as compared to a case where a metal deposition layer formed of silicon nitride, magnesium oxide, or aluminum oxide is formed. In addition, the hard coating layer to be formed later may be uniformly formed, and it is possible to provide an optical laminate which is closely adhered and laminated. More preferably, it is more advantageous to improve coatability of a composition for forming a hard coating layer including silsesquioxane described below and to form a uniform and thin layer.

The silicon oxide deposition layer may be formed by a method selected from a chemical vapor deposition (CVD) method, a physical vapor deposition (PVD) method, an atomic layer deposition (ALD) method, a pulse laser deposition (PLD) method, an E-beam evaporation method, a thermal evaporation method, and a laser molecular beam epitaxy (L-MBE) method, but the present invention is not limited thereto. More preferably, the silicon oxide deposition layer is formed by an E-beam evaporation method, such that deformation of the physical properties of the polyimide-based film which is a base film may be minimized. In addition, it is possible to provide the polyimide-based film having excellent physical properties such as a lower yellow index and transparency.

<Hard Coating Layer>

Next, the hard coating layer will be described in detail.

In an exemplary embodiment of the present invention, the hard coating layer is disposed on the silicon oxide deposition layer to protect a surface of the silicon oxide deposition layer from physical and chemical damage, and to further improve a transmittance and the mechanical physical properties of the entire optical laminate.

In addition, a pencil hardness of the hard coating layer may be 2 H or higher, 3 H or higher, or 4 H or higher. When a scratch test is performed using steel wool (#0000, Liberon Limited), a scratch may not occur at 10 times/1 Kgf, 20 times/1 Kgf, or 30 times/1 Kgf. A water contact angle of the hard coating layer may be 80° or more, 90° or more, or 100° or more.

In addition, a thickness of the hard coating layer may be 1 to 50% of a total thickness of the entire optical laminate. Specifically, the hard coating layer may maintain optical properties while having excellent hardness. The thickness of the hard coating layer may be 1 to 50 µm, and more preferably, 1 to 30 µm. When the thickness of the hard coating layer is within the above range, the hard coating layer may maintain flexibility while having the excellent hardness, such that curl may not substantially occur.

In addition, in order to implement uniform coatability and complementarities of the hard coating layer with the silicon oxide deposition layer and to further reduce a water vapor transmission rate without a crack even when a bending operation is repeatedly performed, the hard coating layer may include a silsesquioxane-based compound, and more specifically, an alicyclic epoxidized silsesquioxane-based compound.

In this case, a weight average molecular weight of the silsesquioxane-based compound may be 1,000 to 20,000 g/mol. When the weight average molecular weight of the silsesquioxane-based compound is within the above range, the composition for forming a hard coating layer may have an appropriate viscosity. Therefore, flowability, coatability, and curing reactivity of the composition for forming a hard coating layer may be improved. In addition, the hardness of the hard coating layer may be improved. In addition, flexibility of the hard coating layer is improved, such that occurrence of curl may be prevented. Preferably, the weight average molecular weight of the silsesquioxane-based compound may be 1,000 to 18,000 g/mol, and more preferably, 2,000 to 15,000 g/mol. The weight average molecular weight is measured using gel permeation chromatography (GPC).

The silsesquioxane-based compound has, for example, a trialkoxysilane compound-derived repeating unit represented by the following Formula 1.

A-Si(OR)₃   [Formula 1]

wherein A represents a C1-C10 linear or branched alkyl group in which a C3-C7 alicyclic alkyl group is substituted with epoxy, and R is independently a C1-C3 alkyl group.

Here, the alkoxysilane compound may be one or more selected from 2-(3,4-epoxycyclohexyl)ethyltrimethoxysilane, 2-(3,4-epoxycyclohexyl)ethyltriethoxysilane, and 3-glycidoxypropyltrimethoxysilane, but the present invention is not limited thereto.

In addition, in an exemplary embodiment of the present invention, the silsesquioxane-based compound may have a trialkoxysilane compound-derived repeating unit represented by Formula 1 and a dialkoxysilane compound-derived repeating unit represented by the following Formula 2. In this case, the silsesquioxane-based compound may be prepared by mixing 0.1 to 100 parts by weight of the dialkoxysilane compound with respect to 100 parts by weight of the trialkoxysilane compound and performing condensation polymerization of the mixture. In this case, although the reason is not clear, a surface hardness is increased and the bending properties are significantly improved, which is more preferable. It is considered that the bending properties are more efficiently exhibited by the alicyclic alkyl group substituted with epoxy in Formula 1, and the effect thereof is more increased as compared to a case where an alicyclic group is absent.

A—SiRₐ(oR)₂   [Formula 2]

wherein $R_a$ is a linear or branched alkyl group selected from C1 to C5, and A and R are as defined in Formula 1.

Specific examples of the compound of Formula 2 may include 2-(3,4-epoxycyclohexyl)ethylmethyldimethoxysilane, 2-(3,4-epoxycyclohexyl)ethylpropyldimethoxysilane, 2-(3,4-epoxycyclohexyl)ethylmethyldiethoxysilane, and 2-(3,4-epoxycyclopentyl)ethylmethyldiethoxysilane, but the present invention is not limited thereto. These compounds may be used alone or as a mixture of two or more thereof.

In addition, in an exemplary embodiment of the present invention, the hard coating layer may include an inorganic filler. For example, a metal oxide such as silica, alumina, or titanium oxide; hydroxide such as aluminum hydroxide, magnesium hydroxide, or potassium hydroxide; a metal particle such as gold, silver, copper, nickel, or alloys thereof; a conductive particle such as carbon, carbon nanotube, or fullerene; glass; or ceramic may be used as the inorganic filler. Preferably, silica may be used in terms of compatibility of the composition with another component. These inorganic fillers may be used alone or as a mixture of two or more thereof.

In addition, the hard coating layer may further include a slip agent. The slip agent may improve winding efficiency, blocking resistance, abrasion resistance, scratch resistance, or the like. For example, waxes such as polyethylene wax, paraffin wax, synthetic wax, and montan wax; and synthetic resins such as a silicone-based resin and a fluorine-based resin may be used as the slip agent. These slip agents may be used alone or as a mixture of two or more thereof.

Hereinafter, a method of forming the hard coating layer will be described in detail.

The hard coating layer is formed by preparing a composition for forming a hard coating layer, and applying and curing the composition onto the silicon oxide deposition layer.

In an exemplary embodiment of the present invention, the composition for forming a hard coating layer includes silsesquioxane, a crosslinking agent, and a photoinitiator.

In addition, the composition for forming a hard coating layer may further include an epoxy-based monomer, a photoinitiator and/or a thermal initiator, a solvent, a thermosetting agent, an inorganic filler, a slip agent, an antioxidant, a UV absorber, a light stabilizer, a thermal polymerization inhibitor, a leveling agent, a surfactant, a lubricant, and an antifoulant.

The crosslinking agent may form a crosslinking bond with an epoxy siloxane-based resin to solidify the composition for forming a hard coating layer, such that the hardness of the hard coating layer may be increased.

For example, the crosslinking agent may contain a compound represented by the following Formula 3. The crosslinking agent, which is an alicyclic epoxy compound having the same epoxy unit as those in structures of Formula 1 and Formula 2, promotes crosslinking bonding and allows the hard coating layer to maintain a refractive index, such that a viewing angle may not be changed, the bending properties may be maintained, and transparency of the hard coating layer may not be damaged, which is preferable.

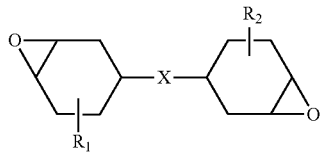

[Formula 3]

wherein $R_1$ and $R_2$ each independently may represent hydrogen or a linear or branched alkyl group having 1 to 5 carbon atoms, and X may be a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

Here, the "direct bond" refers to a structure which is directly bonded without other functional groups. For example, in Formula 3, the direct bond may refer to two cyclohexanes directly connected to each other. In addition, the "connecting group" refers to two or more above-described substituents connected to each other. In addition, in Formula 3, substitution positions of $R_1$ and $R_2$ are not particularly limited, but when the carbon connected to X is set at the position 1, and the carbons connected to epoxy groups are set at the positions 3 and 4, it is preferable that $R_1$ and $R_2$ are substituted at the position 6.

A content of the crosslinking agent is not particularly limited, but may be, for example, 1 to 150 parts by weight with respect to 100 parts by weight of an epoxy siloxane resin. When the content of the crosslinking agent is within the above range, the viscosity of the composition may be maintained in an appropriate range, and coatability and curing reactivity may be improved.

In addition, in an exemplary embodiment of the present invention, various epoxy compounds may be added to the hard coating layer in addition to the above-described compounds of the formulas, as long as the characteristics of the present invention are achieved, but a content thereof is preferably less than 20 parts by weight with respect to 100 parts by weight of the compound of Formula 2.

In an exemplary embodiment of the present invention, the epoxy-based monomer may be included in an amount of 10 to 80 parts by weight with respect to 100 parts by weight of the composition for forming a hard coating layer. Within the above content range, the viscosity may be adjusted, the thickness may be easily adjusted, a surface may be uniform, a defect in a thin film may not occur, and the hardness may be sufficiently achieved, but the present invention is not limited thereto.

In an exemplary embodiment of the present invention, the photoinitiator is a photo-cationic initiator. The photo-cationic initiator may initiate condensation of the epoxy-based monomer including the above-described compounds. As the photo-cationic initiator, for example, an onium salt and/or an organic metal salt may be used, but the present invention is not limited thereto. For example, a diaryliodonium salt, a triarylsulfonium salt, an aryldiazonium salt, an iron-arene complex, or the like may be used. These photo-cationic initiators may be used alone or as a mixture of two or more thereof.

A content of the photoinitiator is not particularly limited, but may be, for example, 0.1 to 10 parts by weight, and more preferably 0.2 to 5 parts by weight, with respect to 100 parts by weight of the compound of Formula 1.

In an exemplary embodiment of the present invention, non-limiting examples of the solvent may include alcohols such as methanol, ethanol, isopropanol, butanol, methyl cellosolve, and ethyl cellosolve; ketones such as methyl ethyl ketone, methyl butyl ketone, methyl isobutyl ketone, diethyl ketone, dipropyl ketone, and cyclohexanone; hexanes such as hexane, heptane, and octane; and benzenes such as benzene, toluene, and xylene. These solvents may be used alone or as a mixture of two or more thereof.

In an exemplary embodiment of the present invention, the solvent may be included in a residual amount excluding the amount of the remaining components in a total weight of the composition.

As an exemplary embodiment, the composition for forming a hard coating layer may further include a thermosetting agent. Examples of the thermosetting agent may include a sulfonium salt-based thermosetting agent, an amine-based thermosetting agent, an imidazole-based thermosetting agent, an acid anhydride-based thermosetting agent, and an amide-based thermosetting agent. It is preferable that a sulfonium salt-based thermosetting agent may be further used in terms of implementing discoloration prevention and high hardness. These thermosetting agents may be used alone or as a mixture of two or more thereof. A content of the thermosetting agent is not particularly limited, but may be, for example, 5 to 30 parts by weight with respect to 100 parts by weight of the epoxy siloxane resin. When the content of the thermosetting agent is within the above range, curing efficiency of the composition for forming a hard coating layer is further improved, such that a hard coating layer having excellent hardness may be formed.

In an exemplary embodiment of the present invention, by using the composition for forming a hard coating layer, the silicon oxide deposition layer may be physically protected and the mechanical physical properties of the entire optical laminate may be further improved. In addition, adhesion with a functional coating layer such as an anti-fingerprint layer to be described below and coatability may be further improved, such that it is possible to provide a window cover film having uniform physical properties over the entire area of the film.

In addition, various epoxy compounds may be added to the hard coating layer of the present invention in addition to the above-described compounds of the formulas, as long as the characteristics of the present invention are achieved, but a content thereof is preferably less than 20 parts by weight with respect to 100 parts by weight of the compound of Formula 1, in terms of achieving the object of the present invention.

A polymerization method of the alicyclic epoxidized silsesquioxane-based compound according to the present invention is not limited as long as it is a known method, but, for example, the alicyclic epoxidized silsesquioxane-based compound may be prepared by hydrolysis and a condensation reaction between alkoxy silanes in the presence of water. The hydrolysis may accelerate a reaction by including a component such as an inorganic acid. In addition, the epoxy siloxane-based resin may be formed by polymerization of a silane compound having an epoxycyclohexyl group.

In an exemplary embodiment of the present invention, the hard coating layer may be formed by applying the above-described composition for forming a hard coating layer onto an upper surface or a lower surface of the silicon oxide deposition layer and curing the composition. The curing may be performed by thermal curing and/or photo-curing, and may be performed by using a method known in the art.

In an exemplary embodiment of the present invention, a plurality of silicon oxide deposition layers and hard coating layers may be laminated. For example, each of the plurality of silicon oxide deposition layers and the plurality of hard coating layers may be alternately laminated. In addition, the hard coating layer may be disposed on each of both surfaces of the silicon oxide deposition layer.

<Functional Coating Layer>

The optical laminate according to an exemplary embodiment of the present invention may further include a functional coating layer formed on the hard coating layer. As a specific example, the optical laminate may further include one or more functional coating layers selected from an antistatic layer, an anti-fingerprint layer, an anti-fouling layer, an anti-scratch layer, a low-refractive layer, an anti-reflective layer, and an impact absorption layer.

Each of the above-described functional coating layers is a coating layer known in the related art. Therefore, specific description thereof will be omitted.

More preferably, the functional coating layer may be an anti-fingerprint layer. By forming the anti-fingerprint layer, the same touch feeling as that of actual glass may be imparted when being applied to a window cover film and occurrence of contamination may be prevented.

In an exemplary embodiment of the present invention, from the viewpoints of imparting the same touch feeling as that of glass and preventing the occurrence of contamination, a water contact angle of the anti-fingerprint layer may be 105° or more, and more specifically, 108° or more or 110° to 120°, and a sliding angle of the anti-fingerprint layer may be 35° or less, 30° or less, or 15° to 25°. Within the above range, the optical laminate may have excellent slip properties and may exhibit the same touch feeling as that of glass, which is more preferable.

More specifically, the anti-fingerprint layer may be derived from a polyfunctional (meth)acrylate polymer having a (meth)acrylate group, a polyfunctional urethane (meth)acrylate oligomer having 6 to 15 (meth)acrylic groups as a functional group, a polyfunctional (meth)acrylate monomer having 2 to 6 (meth)acrylic groups, and a fluorinated (meth)acrylate monomer. The term of the (meth)acrylic group may include both a methacrylate group and an acrylate group.

The polyfunctional (meth)acrylate polymer may have, but is not limited to, a weight average molecular weight (Mw) of 10,000 to 30,000 g/mol and an acrylic equivalent of 100 to 1,000 g/eq. Within the above range, the occurrence of curl may be suppressed and an antifouling property may be improved by a curing reaction with a fluorine (meth)acrylate monomer, such that glass texture may be improved, which is more preferable. Preferably, commercially available products may be used, and examples thereof may include SMP-220A, SMP-250AP, SMP-360AP, and SMP-550AP (Kyoeisha Chemical Co., Ltd.) and 8KX-078 and 8KX-212 (TAISEI Fine Chem. Co., Ltd.), but are not limited thereto.

The polyfunctional urethane (meth)acrylate oligomer having 6 to 15 (meth)acrylic groups as a functional group forms a cured product with another curable monomer, such that hardness, adhesion with the hard coating layer, and a touch feeling may be further improved.

The polyfunctional urethane (meth)acrylate oligomer may be obtained through synthesis, but commercially available products may be preferably used. Examples of the commercially available product may include Miramer SC2152 and SC1020 (Miwon Specialty Chemical Co., Ltd.), Neorad P60 and P61 (DSM NeoResins, Inc.), UA-306I and UA-510H (Kyoeisha Chemical Co., Ltd.), and CN9013NS and CN9010NS (Sartomer Company Inc.), but are not limited thereto. A content of the polyfucntional urethane (meth)acrylate oligomer may be 10 to 90 parts by weight, and more preferably 50 to 80 parts by weight, with respect to 100 parts by weight of the polyfunctional (meth)acrylate polymer. Within the above composition ratio, all of the surface hardness, attachability, slip properties and flexibility of the present invention may be achieved, which is more preferable.

The polyfunctional (meth)acrylate monomer having 2 to (meth)acrylic groups may be a curable monomer, and specific examples thereof may include polyfunctional acrylates such as dipentaerythritol hexa(meth)acrylate, dipentaerythritol penta(meth)acrylate, pentaerythritol tetra(meth)acrylate, ditrimethylolpropane tetra(meth)acrylate, trimethylolpropane tri(meth)acrylate, glycerol tri(meth)acrylate, tris(2-hydroxyethyl)isocyanurate tri(meth)acrylate, ethylene glycol di(meth)acrylate, propylene glycol (meth)acrylate, 1,3-butanedioldi(meth)acrylate, 1,4-butanediol di(meth)acrylate, 1,6-hexanediol di(meth)acrylate, neopentyl glycol di(meth)acrylate, diethylene glycol di(meth)acrylate, triethylene glycol di(meth)acrylate, dipropylene glycol di(meth)acrylate, bis(2-hydroxyethyl)isocyanurate di(meth)acrylate, and hydroxyethyl(meth)acrylate. M340 (Miwon Specialty Chemical Co., Ltd.) or the like may be used as a commercially available product.

A content of the polyfunctional (meth)acrylate monomer may be 10 to 70 parts by weight, and more preferably 30 to 60 parts by weight, with respect to 100 parts by weight of the polyfunctional (meth)acrylate polymer. Within the above composition ratio, all of the surface hardness, attachability, slip properties, and flexibility of the present invention may be achieved, which is more preferable.

The fluorinated (meth)acrylate monomer is not limited as long as it is a monomer having a fluorine-substituted alkyl group, a fluorine-substituted alkyloxy group, and a fluorine-substituted polyalkylene glycol group. In addition, in an exemplary embodiment of the present invention, in a case where a compound having functional groups represented by the following Formula 4 and Formula 5 in order to more dramatically achieve the effects of the present invention, the anti-fingerprint property, the same touch feeling as that of glass, the slip properties, and the surface hardness may be more excellent, which is more preferable. In particular, when a value of n in the following structural formulas is 10 or more and less than 30, more excellent effects may be achieved, which is very preferable.

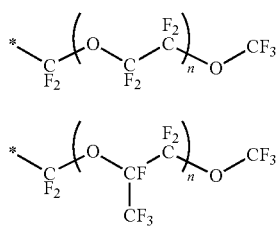

[Formula 4]

[Formula 5]

In Formula 4 and Formula 5, n is an integer of 3 to 30.

Each of the functional groups represented by Formula and Formula 5 has a structure in which fluorines are concentrated in a molecule, such that a content of fluorine in a surface layer of the anti-fingerprint layer, that is, the outermost layer of the window cover film may be further increased. As a result, it is possible to provide a window cover film having an excellent antifouling property and water resistance. In addition, the slip properties of the window cover film are excellent, such that it is possible to allow a user to feel the same touch feeling that of actual glass.

In particular, when the value of n in Formula 4 and Formula 5 in the fluorine-substituted (meth)acrylate monomer is to 30, the above-described effects are more significantly exhibited, which is more preferable.

It is preferable that a content of the fluorine-substituted (meth)acrylate monomer is 0.1 to 20 parts by weight, and more preferably 5 to 15 parts by weight, with respect to 100 parts by weight of the polyfunctional (meth)acrylate polymer, in terms of the same touch feeling as that of glass, the surface hardness, the antifouling property, and the water resistance. In addition, in this case, the slip properties and the bending properties of the window cover film in which the layers are finally laminated are more excellent, which is more preferable, but the present invention is not thereto.

Specifically, as a commercially available fluorinated (meth)acrylate, RS75 (DIC Corporation), Optool DAC-HP (Daikin Industries, Ltd.), or the like may be used, but the present invention is not limited thereto.

Next, a method of forming the anti-fingerprint layer will be described.

The anti-fingerprint layer may be obtained by applying and curing an anti-fingerprint composition including a polyfunctional (meth)acrylate polymer, a polyfunctional urethane (meth)acrylate oligomer having 6 to 15 (meth)acrylic groups as a functional group, a polyfunctional (meth)acrylate monomer having 2 to 6 (meth)acrylic groups, and a fluorinated (meth)acrylate monomer. More specifically, the anti-fingerprint composition may include a photoinitiator and a solvent.

The solvent is not limited as long as it dissolves resins used in the anti-fingerprint composition, but examples thereof may include benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidine, N-acetyl pyrrolidine, N-hydroxymethyl pyrrolidinone, N-butyl pyrrolidinone, N-ethyl pyrrolidinone, N-(N-octyl)pyrrolidinone, N-(N-dodecyl) pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, hexafluoroantimonate, monoalkyl ether of ethylene glycol, dialkyl ether of ethylene glycol, and derivatives (cellosolve) thereof. In addition, these solvents may be used alone or as a mixture of two or more thereof.

A content of the solvent is not limited, but may be 30 to 90 wt %, and more preferably 50 to 70 wt %, with respect to a total weight of the anti-fingerprint composition.

The photoinitiator is not limited as long as it is generally used in the polyfunctional (meth)acrylate resin, and specific examples thereof may include acetophenones, benzophenones, benzoins, propiophenones, benzyls, acylphosphic oxides, Michler's benzoyl benzoate, α-amyloxime ester, tetramethylfuran monosulfide, and thioxanthone. More specifically, benzophenone, 2-methyl-1-[4-(methylthio)phenyl] 2-morpholinepropan-1-one, diphenyl ketone benzyl dimethyl ketal, 2-hydroxy-2-methyl-1-phenyl-1-one, 4-hydroxycyclophenylketone, dimethoxy-2-phenylacetophenone, anthraquinone, fluorene, triphenylamine, carbazole, 3-methylacetophenone, 4-chloroacetophenone, 4,4-dimethoxyacetophenone, 4,4-diaminobenzophenone, and 1-hydroxycyclohexylphenylketone may be used as the photoinitiator, but the present invention is not limited thereto.

In addition, the anti-fingerprint composition may further include inorganic particles, if necessary. The anti-fingerprint composition includes the inorganic particles, such that the slip properties and abrasion resistance may be further improved.

One or a mixture selected from silica and alumina having an average particle diameter of 50 nm or less may be used as the inorganic particle. Within the above average particle diameter, the particles may have excellent dispersibility and excellent slip properties, and may be suitable for satisfying the physical property in which the ratio of the static friction coefficient a to the dynamic friction coefficient b according to Expression 1(KR 10-2147367 B1) of the present invention is 0.5 to 1.5, which is preferable.

An inorganic particle whose surface is treated may be used to increase dispersibility. A content of the inorganic particles is not limited, but the content of the inorganic particles in a composition (solid content) except for the solvent may be 0.1 to 5 wt %, and more specifically, 1 to 3 wt %.

By using the anti-fingerprint composition in the present invention, as described above, it is possible to allow a user to feel the same touch feeling that of actual glass, and a window cover film having excellent durability and curl suppression property may be provided. The "curl suppression property" may mean that a degree of curl is significantly low. The degree of curl may refer to a vertical height from the lowest point (for example, the center) of a window cover film to a vertex of a sample obtained by cutting the window cover film into a square with 10 cm sides so that the sample is inclined at an angle of 45° in an MD direction.

In the present invention, the MD direction is a machine direction, and may refer to a direction in which the film is moved along an automatic machine when the film is stretched or laminated in an automatic process. The curl of the sample inclined at the angle of 45° in the MD direction is measured, such that the curl at each vertex means curl in the MD direction and a direction vertical to the MD direction. Therefore, the curl in each direction may be determined. In some exemplary embodiments, the degree of curl of the window cover film may be 5 mm or less.

<Flexible Display Panel>

In an exemplary embodiment of the present invention, a window cover film including the optical laminate according to an exemplary embodiment, and a flexible display panel or flexible display device that includes the optical laminate according to an exemplary embodiment may be provided.

In this case, the window cover film may be used as the outermost window substrate of the flexible display device. The flexible display device may be various image display devices such as a general liquid crystal display device, an electro-luminescence display device, a plasma display device, and a field emission display device.

Hereinafter, the present invention will be described in more detail on the basis of Examples and Comparative Examples. However, the following Examples and Comparative Examples are only examples for describing the present invention in more detail, and the present invention is not limited by Examples and Comparative Examples.

Hereinafter, physical properties were measured as follows.

1) Light Transmittance

A total light transmittance of each of the polyimide-based film and the optical laminate produced in the following Examples was measured in a whole wavelength region of 400 to 700 nm using a spectrophotometer (COH-400, Nippon Denshoku Industries Co., Ltd.) according to the ASTM D1746 standard. A unit of the light transmittance is %

2) Haze

A haze of each of the polyimide-based film and the optical laminate produced in the following Examples was measured using the spectrophotometer (COH-400, Nippon Denshoku Industries Co., Ltd.) according to the ASTM D1003 standard. A unit of the haze is %

3) Yellow Index (YI)

A yellow index of each of the polyimide-based film and the optical laminate produced in the following Examples was measured using a colorimeter (ColorQuest XE, Hunter Associates Laboratory, Inc.) according to the ASTM E313 standard.

4) Modulus/Elongation at Break

A modulus and an elongation at break of the polyamide-imide film were measured under a condition in which the polyamide-imide film having a length of 50 mm and a width of 10 mm was pulled according to ASTM D882 at 25° C. and 50 mm/min using a UTM 3365 (Instron Corporation).

A thickness of the film was measured, and data of a value thereof was input to the device. A unit of the modulus is GPa, and a unit of the elongation at break is %.

5) Weight Average Molecular Weight

<Weight Average Molecular Weight of Film>

A weight average molecular weight of the film was measured by dissolving the film in a DMAc eluent containing 0.05 M LiBr. Waters GPC system, Waters 1515 isocratic HPLC Pump, and Waters 2414 Refractive Index detector were used as GPC, an Olexis, a Polypore, and a mixed D column were connected to each other and used as a column, polymethyl methacrylate (PMMA STD) was used as a standard material, and the analysis was performed at 35° C. and a flow rate of 1 mL/min.

<Weight Average Molecular Weight of Silsesquioxane Resin>

In the measurement of a weight average molecular weight of a silsesquioxane resin, GPC (Waters GPC system, Waters 1515 isocratic HPLC Pump, Waters 2414 Refractive Index detector) was used, four Shodexs KF-801, 802.5, 803, and 805 (Waters Corporation) that were connected to each other in series were used as a GPC column, THF was used as a solvent, and a rate was 1 mL/min.

6) Pencil Hardness of Optical Laminate

According to JIS K5400, the optical laminate produced in each of the following Examples and Comparative Examples was attached to glass, a 20 mm line was drawn at a speed of 50 mm/sec and a load of 750 g, drawing was repeated 5 times or more, and after 24 hours, a mark or a scratch was observed, to measure a pencil hardness when the mark or scratch was generated one or more times.

7) Vickers Hardness of Optical Laminate

A Vickers hardness (unit: HV) was measured using an indenter. The measurement was performed using a FISCHERSCOPE HM-2000 (Helmut Fischer) at a load of 12 mN for a loading time of 12 seconds.

8) Folding Property Evaluation

The optical laminate produced in each of the following Examples and Comparative Examples was cut into 100 mm in width and 100 mm in length, the cut optical laminate was fixed to a folding tester (YUASA) using an adhesive, a radius of folding was set to 3 mm, an in-folding test was performed at a speed of 60 cycles/min 200,000 times, an out-folding test was performed on the same sample at the same speed and times as those in the in-folding test so that the same position was folded, and the presence or absence of a crack at the folded portion was visually observed.

After the test was performed 200,000 times, a case where the crack was not generated was represented by "Pass", and a case where a crack was generated was represented by "Crack".

9) Water Vapor Transmission Rate (WVTR)

The optical laminate produced in each of the following Examples and Comparative Examples was cut into a size of 20×20 mm based on JIS K7129, and a water vapor transmission rate was measured using a water vapor transmission rate measuring device (Mocon PERMATRAN-W Model 3/61).

10) Adhesive Force

The optical laminate produced in each of the following Examples and Comparative Examples was cut into 1 inch in width and 15 cm in length based on ASTM D3330, the cut optical laminate was adhered to glass so that it was opposite to the self-restoration barrier adhesive layer, and an adhesive force was measured at a 180° peel using a UTM.

11) Storage Modulus

An adhesive solution was dropped on a transparent PMMA plate having a diameter of 20 mm according to the ISO 6721-10 standard using a Rheometer DHR-2 (TA Instruments), the entire plate was filled with the sample so that a gap between a rotor and the plate was 100 µm, curing was performed at 2,000 mJ/cm$^2$ using an LED light source with ultraviolet rays of 340 nm, a storage modulus was measured for each frequency (0.01 Hz, 0.1 Hz, and 1 Hz) at the time when the curing was finished, and a value of 1 Hz was used as a storage modulus.

[Preparation Example 1] Preparation of Composition for Forming Substrate Layer

Terephthaloyl dichloride (TPC) and 2,2'-bis(trifluoromethyl)-benzidine (TFMB) were added to a solution in which dichloromethane and pyridine were mixed with each other in a reactor, and stirring was performed under a nitrogen atmosphere at 25° C. for 2 hours. In this case, a molar ratio of TPC:TFMB was set to 300:400, and a solid content was adjusted to 10 wt %. Thereafter, the reactant was precipitated in an excess amount of methanol and then filtered, and the obtained solid content was vacuum-dried at 50° C. for 6 hours or longer to obtain an oligomer. A formula weight (FW) of the produced oligomer was 1,670 g/mol.

N,N-dimethylacetamide (DMAc) as a solvent, 100 moles of the oligomer, and 28.6 moles of 2,2'-bis(trifluoromethyl)-benzidine (TFMB) were injected into the reactor and stirring was sufficiently performed.

After confirming that the solid raw material was completely dissolved, fumed silica (surface area: 95 m$^2$/g, <1 μm) was added to DMAc in an amount of 1,000 ppm with respect to the solid content, and the fumed silica was dispersed using ultrasonic waves and then injected into the reactor. 64.3 moles of cyclobutanetetracarboxylic dianhydride (CBDA) and 64.3 moles of 4,4'-hexafluoroisopropylidene diphthalic anhydride (6FDA) were sequentially injected, stirring was sufficiently performed, and then polymerization was performed at 40° C. for 10 hours. At this time, the solid content was 20 wt %. Subsequently, pyridine and acetic anhydride were sequentially added to a solution, respectively, at 2.5-fold moles relative to a total content of the dianhydride, and stirring was performed at 60° C. for 12 hours.

After the polymerization was finished, the polymerization solution was precipitated in an excess amount of methanol and filtered, and the obtained solid content was vacuum-dried at 50° C. for 6 hours or longer, thereby obtaining polyamide-imide powder. The powder was diluted and dissolved with DMAc at 20% to prepare a composition for forming a substrate layer.

[Preparation Example 2] Preparation of Composition for Forming Adhesive Layer 65 wt % of a monofunctional polybutadiene urethane acrylate oligomer (SUO-H8155, SHIN-A T&C), 10 wt % of an isobornyl acrylate monomer, 17 wt % of a lauryl acrylate monomer, 5 wt % of an N,N-dimethylacrylamide monomer, and 3 wt % of 2,4,6-trimethylbenzoyl-diphenylphosphine oxide as a photoinitiator were mixed with each other for 3 hours, thereby preparing a composition for an adhesive layer. A storage modulus after curing the composition was $2 \times 10^5$ Pa.

[Preparation Example 3] Preparation of Composition for Forming Adhesive Layer 65 wt % of a monofunctional polybutadiene urethane acrylate oligomer (SUO-H8155, SHIN-A T&C), 10 wt % of a trimethylcyclohexyl acrylate monomer, 17 wt % of an isodecyl acrylate monomer, 5 wt % of an N,N-dimethylacrylamide monomer, and 3 wt % of 2,4,6-trimethylbenzoyl-diphenylphosphine oxide as a photoinitiator were mixed with each other for 3 hours, thereby preparing a composition for an adhesive layer. A storage modulus after curing the composition was $2 \times 10^5$ Pa.

[Preparation Example 4] Preparation of Composition for Forming Adhesive Layer 65 wt % of a monofunctional polypropylene urethane acrylate oligomer (SUO-1000, SHIN-A T&C), 15 wt % of an isobornyl acrylate monomer, 17 wt % of a lauryl acrylate monomer, and 3 wt % of 2,4,6-trimethylbenzoyl-diphenylphosphine oxide as a photoinitiator were mixed with each other for 3 hours, thereby preparing a composition for an adhesive layer. A storage modulus after curing the composition was $5 \times 10^6$ Pa.

[Preparation Example 5] Preparation of Composition for Forming Hard Coating Layer 2-(3,4-epoxycyclohexyl)ethyltrimethoxysilane (ECTMS) and water were mixed with each other in a ratio of 24.64 g:2.70 g (0.1 mol:0.15 mol) to prepare a reaction solution, and the reaction solution was placed into a 250 mL 2-neck flask. 0.1 mL of tetramethylammonium hydroxide as a catalyst and 100 mL of tetrahydrofuran were added to the mixture and stirring was performed at 25° C. for 36 hours. Thereafter, layer separation was performed, a product layer was extracted with methylene chloride, water was removed from the extract with magnesium sulfate, and the solvent was vacuum-dried, thereby obtaining an epoxy siloxane-based resin. A weight average molecular weight of the epoxy siloxane-based resin was measured using gel permeation chromatography (GPC), and the measured weight average molecular weight was 2,500 g/mol.

A composition was prepared by mixing 30 g of the prepared epoxy siloxane-based resin, 10 g of (3',4'-epoxycyclohexyl)methyl 3,4-epoxycyclohexanecarboxylate and 5 g of bis[(3,4-epoxycyclohexyl)methyl]adipate as a crosslinking agent, 0.5 g of (4-methylphenyl)[4-(2-methylpropyl) phenyl]iodoniumhexafluorophosphate as a photoinitiator, and 54.5 g of methyl ethyl ketone with each other.

[Preparation Example 6] Preparation of Composition for Forming Anti-Fingerprint Layer 75 parts by weight of 10-functional urethane acrylate (SC1020, Miwon Specialty Chemical Co., Ltd.), 50 parts by weight of pentaerythritol tri/tetraacrylate (M340, Miwon Specialty Chemical Co., Ltd.), 5 parts by weight of fluorine acrylate (Optool DAC-HP, Daikin Industries, Ltd.), 15 parts by weight of 1-hydroxy-cyclohexyl-phenyl-ketone (Omnirad 184, IGM Resins) as a photoinitiator, and 255 parts by weight of methyl ethyl ketone, with respect to 100 parts by weight of a polyfunctional (meth)acrylate polymer (SMP-250AP, Kyoeisha Chemical Co., Ltd.), were stirred for 1 hour, and the mixture was filtered by a 0.2 μm PP Cartridge Filter, thereby preparing an anti-fingerprint composition for an AF layer.

[Example 1] Production of Optical Laminate

The composition for forming a substrate layer prepared in Preparation Example 1 was coated onto a polyethylene terephthalate (PET) base film using an applicator, drying was performed at 80° C. for 30 minutes and 100° C. for 1 hour, and cooling was performed at room temperature, thereby producing a film. Thereafter, the film was subjected to a stepwise heat treatment at 100 to 200° C. and 250 to 300° C. for 2 hours and a heating rate of 20° C./min.

The produced polyamide-imide film had a thickness of 50 μm, a total light transmittance of 89.73%, a haze of 0.4%, a yellow index (YI) of 1.9, a modulus of 6.5 GPa, an elongation at break of 21.2%, a weight average molecular weight of 310,000 g/mol, and a polydispersity index (PDI) of 2.11.

A rotary drum was supported at an upper and bottom of a main chamber where vacuum was performed, a cathode chamber was installed so that $SiO_2$ was deposited on an inner surface of the main chamber, and gas, that is, an inert gas (Ar), and oxygen ($O_2$) were injected into a device for targeting Si, the device being designed to be supplied with gas and oxygen using a pump, thereby depositing a $SiO_2$ layer having a thickness of 50 nm on one surface of the produced polyimide based film having a thickness of 50 μm.

The composition for forming a hard coating layer prepared in Preparation Example 5 was applied onto the $SiO_2$ deposition layer using a meyer bar, drying was performed at 60° C. for 5 minutes, UV irradiation was performed at 1 J/cm² using a high-pressure metal lamp, and thermal curing was performed at 120° C. for 15 minutes, thereby forming a hard coating layer having a thickness of 10 μm.

The composition for an adhesive layer prepared in Preparation Example 2 was coated on the other surface of the polyimide-based film on which the $SiO_2$ deposition layer was formed at a thickness of 50 μm through bar coating, UV irradiation was performed at 1,000 J/cm² using a high-pressure metal lamp to form an adhesive layer in a semi-cured state (IR Conversion 85%), and a UV-blocking release film (L3T, 100 μm, YoulChon Chemical, Co., Ltd.) subjected to a release treatment with silicone was laminated on an upper surface of the adhesive layer, thereby producing an optical laminate. In addition, the main curing was performed, and then, the produced optical laminate was evaluated.

The physical properties of the produced optical laminate were measured. The results are shown in Table 1.

Example 2

The composition for forming an anti-fingerprint layer prepared in Preparation Example 6 was applied onto the hard coating layer of the optical laminate produced in Example 1 using a meyer bar, drying was performed at 60° C. for 5 minutes, and UV irradiation was performed at 1,000 J/cm² using a high-pressure metal lamp, thereby producing a 2 μm-thick optical laminate in which the anti-fingerprint layer was formed.

The physical properties of the produced optical laminate were measured. The results are shown in Table 1.

Example 3

An optical laminate was produced in the same manner as that of Example 1, except that the composition for an adhesive layer prepared in Preparation Example 3 was applied.

The physical properties of the produced optical laminate were measured. The results are shown in Table 1.

Example 4

An optical laminate was produced in the same manner as that of Example 2, except that the composition for an adhesive layer prepared in Preparation Example 3 was applied.

The physical properties of the produced optical laminate were measured. The results are shown in Table 1.

Comparative Example 1

An optical laminate was produced in the same manner as that of Example 1, except that the $SiO_2$ deposition layer and the hard coating layer were formed, and when forming the adhesive layer, the composition for an adhesive layer prepared in Preparation Example 4 was applied and curing was performed.

The physical properties of the produced optical laminate were measured. The results are shown in Table 1.

Comparative Example 2

An optical laminate was produced in the same manner as that of Example 1, except that the $SiO_2$ deposition layer and the hard coating layer were formed, and the adhesive layer was formed by laminating an optically clear adhesive (OCA) (OCA 8180, 25 um, storage modulus: $2\times10^4$ Pa, 3M Company) on a surface opposite to the surface of the polyimide-based film on which the $SiO_2$ deposition layer and the hard coating layer were formed.

The physical properties of the produced optical laminate were measured. The results are shown in Table 1.

Comparative Example 3

An optical laminate was produced in the same manner as that of Example 1, except that the $SiO_2$ deposition layer was not formed, and the adhesive layer was formed by laminating an optically clear adhesive (OCA) (OCA 8180, 25 μm, storage modulus: $2\times10^4$ Pa, 3M Company) on a surface opposite to the surface of the polyimide-based film on which the hard coating layer was formed.

The physical properties of the produced optical laminate were measured. The results are shown in Table 1.

TABLE 1

|  | Example 1 | Example 2 | Example 3 | Example 4 | Comparative Example 1 | Comparative Example 2 | Comparative Example 3 |
|---|---|---|---|---|---|---|---|
| Total light transmittance (%) | 90.2 | 90.4 | 90.1 | 90.3 | 89.2 | 88.6 | 89.5 |
| Haze (%) | 0.4 | 0.5 | 0.6 | 0.4 | 0.7 | 1.1 | 0.9 |
| Yellow index | 2.3 | 2.1 | 2.2 | 2.4 | 4.3 | 3.5 | 3.2 |
| Pencil hardness of optical laminate | 3B | 2B | 2B | B | 4B | 6B | 7B |
| Vickers hardness (HV) of optical laminate | 68 | 76 | 72 | 80 | 25 | 10 | 7 |
| Folding properties | Pass | Pass | Pass | Pass | Crack | Crack | Crack |
| Water vapor transmission rate (g/m² · day) | $10^{-4}$ | $10^{-5}$ | $10^{-4}$ | $10^{-5}$ | $10^{-1}$ | 250 | 400 |
| Adhesive force (kgf/inch) | 0.8 | 0.8 | 1.2 | 1.2 | 0.4 | 0.3 | 0.3 |

As shown in the above table, it was confirmed that in the case of the optical laminate having the laminate structure according to the present invention, the total light transmittance was 90% or more, the haze was 1% or less, the yellow index was 3 or less, the pencil hardness was 3 B or higher, the Vickers hardness was 30 HV or higher, a crack was not generated even when bending was performed 200,000 times in the folding property test, and the water vapor transmission rate was $1 \times 10^{-3}$ g/m$^2$·day or less, which showed that the optical laminate exhibited excellent physical properties to be used in a window cover film.

The present invention may provide an optical laminate capable of being applied to a window cover film because the optical laminate has excellent water-blocking properties such as a low water vapor transmission rate, excellent transparency, excellent mechanical strength, and excellent optical physical properties such as a low yellow index.

Further, the present invention may provide an optical laminate which prevents occurrence of a mark or a crack even after repeatedly being bent due to its excellent elasticity, flexibility, and self-restoration properties, and prevents a delamination phenomenon of the adhesive layer even when the optical laminate is repeatedly deformed because the optical laminate has excellent adhesion.

Further, the optical laminate has a high surface hardness, is flexible, has excellent bending properties, and prevents occurrence of a fine crack even after repeatedly being bent. Therefore, the present invention may provide the optical laminate capable of securing durability and long-term lifetime of a flexible display device.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the scope and spirit of the present invention.

What is claimed is:

1. An optical laminate comprising:
   a polyimide-based film;
   a self-restoration barrier adhesive layer formed on one surface of the polyimide-based film, wherein the self-restoration barrier adhesive layer comprises a structure derived from a polybutadiene-modified urethane-based (meth)acrylate oligomer, a (meth)acrylate monomer having an aliphatic ring, a C8-C18alkyl (meth)acrylate monomer, and a (meth)acrylamide-based monomer; and
   a silicon oxide deposition layer formed on the other surface of the polyimide-based film, wherein a water vapor transmission rate of the optical laminate is $1 \times 10^{-3}$ g/m$^2$·day or less.

2. The optical laminate of claim 1, further comprising a hard coating layer formed on the silicon oxide deposition layer.

3. The optical laminate of claim 2, wherein a thickness of the hard coating layer is 1 to 50 μm.

4. The optical laminate of claim 2, wherein a pencil hardness of the hard coating layer is 3 H or higher.

5. The optical laminate of claim 2, further comprising one or more functional coating layers selected from an antistatic layer, an anti-fingerprint layer, an anti-fouling layer, an anti-scratch layer, a low-refractive layer, an anti-reflective layer, and an impact absorption layer, the functional coating layer being formed on the hard coating layer.

6. The optical laminate of claim 5, wherein a thickness of the functional coating layer is 0.01 to 50 μm.

7. The optical laminate of claim 5, wherein the functional coating layer is an anti-fingerprint layer having a water contact angle of 105° or more.

8. The optical laminate of claim 1, wherein the optical laminate has a total light transmittance of 90% or more, a haze of 1% or less, and a yellow index of 3 or less.

9. The optical laminate of claim 1, wherein the optical laminate has a pencil hardness of 3 B or higher and a Vickers hardness of 30 HV or higher.

10. The optical laminate of claim 1, wherein the silicon oxide deposition layer is formed by a method selected from a chemical vapor deposition (CVD) method, an atomic layer deposition (ALD) method, a pulse laser deposition (PLD) method, an E-beam evaporation method, a thermal evaporation method, and a laser molecular beam epitaxy (L-MBE) method.

11. The optical laminate of claim 1, wherein the silicon oxide deposition layer is formed of $SiO_2$.

12. The optical laminate of claim 1, wherein the self-restoration barrier adhesive layer has an adhesive force to glass of 0.5 kgf/inch or more.

13. The optical laminate of claim 1, wherein the polyimide-based film has an elongation at break measured according to ASTM D882 of 8% or more and a modulus measured according to ASTM D882 of 6 GPa or more.

14. The optical laminate of claim 1, wherein the polyimide-based film has a light transmittance measured at 388 nm according to ASTM D1746 of 5% or more, a total light transmittance measured at 400 to 700 nm according to ASTM D1746 of 87% or more, a haze of 2.0% or less, a yellow index of 5.0 or less, and a b* value of 2.0 or less.

15. The optical laminate of claim 1, wherein the polyimide-based film has a polyamide-imide structure.

16. The optical laminate of claim 1, wherein the polyimide-based film includes a unit derived from a fluorine-based aromatic diamine, a unit derived from an aromatic dianhydride, and a unit derived from an aromatic diacid dichloride.

17. The optical laminate of claim 16, wherein the polyimide-based film further includes a unit derived from an alicyclic dianhydride.

18. The optical laminate of claim 1, wherein a thickness of the polyimide-based film is 10 to 500 μm,
   a thickness of the self-restoration barrier adhesive layer is 10 to 100 μm, and
   a thickness of the silicon oxide deposition layer is 2 to 500 nm.

19. A window cover film comprising the optical laminate of claim 1.

20. A flexible display panel comprising the optical laminate of claim 1.

* * * * *

UNITED STATES PATENT AND TRADEMARK OFFICE
CERTIFICATE OF CORRECTION

PATENT NO. : 11,796,718 B2
APPLICATION NO. : 17/233644
DATED : October 24, 2023
INVENTOR(S) : Jong Nam Ahn It is certified that error appears in the above-identified patent and that said Letters Patent is hereby corrected as shown below:

In the Claims

Column 27, Line 52, Claim 1, delete "C8-C18alkyl" and insert -- C8-C18 alkyl --

Signed and Sealed this
Twenty-sixth Day of December, 2023

Katherine Kelly Vidal
*Director of the United States Patent and Trademark Office*